United States Patent
Jang et al.

(10) Patent No.: US 11,745,462 B2
(45) Date of Patent: Sep. 5, 2023

(54) OPTICAL ADHESIVE SHEET

(71) Applicant: LG Chem, Ltd., Seoul (KR)

(72) Inventors: Ae-Jung Jang, Gyeonggi-do (KR);
Hong-June Choi, Gyeonggi-do (KR);
Jang-Soon Kim, Gyeonggi-do (KR)

(73) Assignee: LG Chem, Ltd.

( * ) Notice: Subject to any disclaimer, the term of this patent is extended or adjusted under 35 U.S.C. 154(b) by 51 days.

(21) Appl. No.: 15/545,756

(22) PCT Filed: Mar. 9, 2016

(86) PCT No.: PCT/KR2016/002334
§ 371 (c)(1),
(2) Date: Jul. 24, 2017

(87) PCT Pub. No.: WO2016/208844
PCT Pub. Date: Dec. 29, 2016

(65) Prior Publication Data
US 2018/0010016 A1    Jan. 11, 2018

(30) Foreign Application Priority Data

Jun. 22, 2015    (KR) .................. 10-2015-0088636

(51) Int. Cl.

| | |
|---|---|
| *B32B 5/18* | (2006.01) |
| *B32B 27/36* | (2006.01) |
| *B32B 15/04* | (2006.01) |
| *B32B 5/22* | (2006.01) |
| *C09J 4/00* | (2006.01) |
| *B32B 15/09* | (2006.01) |
| *C09J 7/26* | (2018.01) |
| *B32B 27/08* | (2006.01) |
| *B32B 27/06* | (2006.01) |
| *C09J 7/38* | (2018.01) |
| *B32B 7/12* | (2006.01) |
| *B32B 37/12* | (2006.01) |
| *C09J 133/02* | (2006.01) |
| *C09J 133/12* | (2006.01) |

(52) U.S. Cl.
CPC .................. *B32B 5/18* (2013.01); *B32B 5/22* (2013.01); *B32B 7/12* (2013.01); *B32B 15/046* (2013.01); *B32B 15/09* (2013.01); *B32B 27/06* (2013.01); *B32B 27/065* (2013.01); *B32B 27/08* (2013.01); *B32B 27/36* (2013.01); *B32B 37/12* (2013.01); *C09J 4/00* (2013.01); *C09J 7/26* (2018.01); *C09J 7/385* (2018.01); *C09J 133/02* (2013.01); *C09J 133/12* (2013.01); *B32B 2266/025* (2013.01); *B32B 2266/0242* (2013.01); *B32B 2266/0278* (2013.01); *B32B 2307/40* (2013.01); *B32B 2307/546* (2013.01); *B32B 2307/558* (2013.01); *B32B 2310/0831* (2013.01); *B32B 2405/00* (2013.01); *C09J 2203/318* (2013.01); *C09J 2301/312* (2020.08); *C09J 2400/243* (2013.01); *C09J 2423/046* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 2007/0117918 A1 | 5/2007 | Kim et al. | |
| 2010/0002413 A1 | 1/2010 | Igarashi et al. | |
| 2011/0237725 A1* | 9/2011 | Clapper | C09J 133/04 524/271 |
| 2012/0183769 A1* | 7/2012 | Nasu | C09J 133/24 428/352 |
| 2014/0037951 A1* | 2/2014 | Shigetomi | C09J 133/08 428/355 AC |
| 2015/0140249 A1 | 5/2015 | Yoon et al. | |
| 2018/0022972 A1* | 1/2018 | Zhu | C08F 220/14 428/411.1 |

FOREIGN PATENT DOCUMENTS

| | | |
|---|---|---|
| CN | 101529320 A | 9/2009 |
| CN | 102482546 A | 5/2012 |
| CN | 104334663 A | 2/2015 |
| JP | 2003096116 A | 4/2003 |
| JP | 2003147281 A | 5/2003 |
| JP | 2011241160 A | 12/2011 |
| JP | 2012201877 A * | 10/2012 |
| KR | 100831558 B1 | 5/2008 |
| KR | 20100029512 A | 3/2010 |
| KR | 20130131795 A | 12/2013 |
| WO | 2014189734 A1 | 11/2014 |

OTHER PUBLICATIONS

JP2012201877 English Machine Translation.*
Search Report from International Application No. PCT/KR2016/002334, dated May 10, 2016.
Chinese Search Report for Application No. 201680008119.0, dated Oct. 18, 2019, pp. 1-2.
Li Zidong et al., Adhesive Auxiliaries, Chemical Industry Press, 2nd Edition, Jun. 2009, pp. 135-136. (English translation of abstract attached).
Yang Yukun et al., Handbook of Pressure-Sensitive Adhesive Products Technology, Chemical Industry Press, 1st Edition, Sep. 2004, p. 113. (English translation of abstract attached).

* cited by examiner

*Primary Examiner* — Alicia Chevalier
*Assistant Examiner* — Elaine M Vazquez
(74) *Attorney, Agent, or Firm* — Lerner David LLP

(57) ABSTRACT

An optical adhesive sheet having an excellent repulsion resistance and an excellent swelling rate, and a method for manufacturing the same.

6 Claims, No Drawings

OPTICAL ADHESIVE SHEET

CROSS-REFERENCE TO RELATED APPLICATIONS

The present application is a national phase entry under 35 U.S.C. § 371 of International Application No. PCT/KR2016/002334 filed Mar. 9, 2016, published in Korean, which claims priority from Korean Patent Application No. 10-2015-0088636 filed Jun. 22, 2015, all of which are incorporated herein by reference.

TECHNICAL FIELD

The present invention relates to an optical adhesive sheet having an excellent repulsion resistance and an excellent swelling rate, and a method for manufacturing the same.

BACKGROUND ART

A demand for an image display device which inputs, manipulates, and displays information by using a touch screen, such as a TV set, a computer, a mobile communication terminal, a navigator for a vehicle, and an automated teller machine is increasing.

An image display device includes a protective unit such as a glass substrate or a transparent plastic substrate on an image display unit such as a liquid crystal display (LCD), and since light does not penetrate an edge region of the image display device, the edge region of the image display device may be formed by including a portion on which images, and the like are not displayed and an end portion of a main body of the image display device.

The edge region of the image display device is referred to as a bezel, and in the bezel, the image display unit and the protective unit of the image display device may be adhered to each other through an optical adhesive sheet.

Further, as described above, in a bezel of an image display device, an optical adhesive sheet, which adheres an image display unit and a protective unit, may be formed by, for example, an acrylic adhesive agent, and the like.

DETAILED DESCRIPTION OF THE INVENTION

Technical Problem

An object of the present invention is to provide an optical adhesive sheet, which has an excellent repulsion resistance and an excellent swelling rate.

Another object of the present invention is to provide a manufacturing method to which photo-curing conditions, which allow an optical adhesive sheet to have an excellent repulsion resistance and an excellent swelling rate as described above, are applied.

Technical Solution

An aspect of the present invention may provide an optical adhesive sheet, including: a substrate; and an adhesive agent layer formed on at least one surface of the substrate, in which the adhesive agent layer is formed by curing an adhesive agent composition, which includes an acrylic copolymer formed by polymerizing a monomer mixture including ethylhexyl acrylate and isobornyl acrylate, at an ambient temperature of 20 to 30° C. by irradiation with UV light having a UV intensity of 6 to 8 mW/cm², and a swelling rate of the adhesive agent layer, which is calculated by the following Equation 1, is 60% or more.

$$\text{Swelling rate (\%)} = (W_2/W_1) \times 100 \qquad \text{[Equation 1]}$$

Here, $W_1$ = an initial weight which is a weight of a sample before immersing the sample, which is obtained by cutting a cured adhesive agent layer into a predetermined size, into a solvent, and $W_2$ = a post weight which is a weight of a sample obtained by immersing the sample into a solvent, leaving the sample to stand for a predetermined time, filtering the sample using a filtration device, and then drying the sample.

Here, a total UV dose irradiated onto the adhesive agent composition at the ambient temperature may be 1,500 mJ/cm² or more.

Here, the adhesive agent composition may further include a photoinitiator selected from the group consisting of a benzoin-based initiator, a hydroxy ketone-based initiator, an amino ketone-based initiator, caprolactam, and a combination thereof.

Here, the substrate may be a thermoplastic foam or a thermosetting foam.

Another aspect of the present invention may provide a method for manufacturing an optical adhesive sheet, the method including: forming an adhesive agent composition including an acrylic copolymer formed by polymerizing a monomer mixture including ethylhexyl acrylate and isobornyl acrylate; and forming an adhesive agent layer by UV-curing the adhesive agent composition formed on at least one surface of a substrate, in which the UV-curing is carried out by using UV light having a UV intensity of 6 to 8 mW/cm² at an ambient temperature of 20 to 30° C., and a swelling rate of the adhesive agent layer, which is calculated by the following Equation 1, is 60% or more.

$$\text{Swelling rate (\%)} = (W_2/W_1) \times 100 \qquad \text{[Equation 1]}$$

Here, $W_1$ = an initial weight which is a weight of a sample before immersing the sample, which is obtained by cutting a cured adhesive agent layer into a predetermined size, into a solvent, and $W_2$ = a post weight which is a weight of a sample obtained by immersing the sample into a solvent, leaving the sample to stand for a predetermined time, filtering the sample using a filtration device, and then drying the sample.

Here, a total UV dose irradiated onto the adhesive agent composition at the ambient temperature may be 1,500 mJ/cm² or more.

Here, the adhesive agent composition may further include a photoinitiator selected from the group consisting of a benzoin-based initiator, a hydroxy ketone-based initiator, an amino ketone-based initiator, caprolactam, and a combination thereof.

Here, the substrate may be a thermoplastic foam or a thermosetting foam.

Advantageous Effects

A space capable of being impregnated with a solvent is sufficiently secured in an adhesive agent layer included in an optical adhesive sheet according to the present invention, and accordingly, it is possible to implement an excellent repulsion resistance and reliability under high temperature/high humidity because flexibility of the adhesive layer is improved.

Best Mode

In order to more easily understand the present invention, specific terms are defined herein for convenience. Unless otherwise defined herein, scientific terms and technical terms used in the present invention will have the meaning commonly understood by a person with ordinary skill in the art. Further, it is to be understood that unless specially indicated in the context, terms in a singular form include the plural forms thereof, and terms in a plural form also include the singular forms thereof.

Hereinafter, an optical adhesive sheet according to an exemplary embodiment of the present invention will be described in more detail.

In general, in a bezel of an image display device, an image display unit and a protective unit, which are formed of different materials such as, for example, glass and plastic or glass and metal, are adhered to each other through an optical adhesive tape, and the optical adhesive tape may be formed by, for example, an acrylic adhesive agent, and the like.

However, it is very difficult to adjust the degree to which a cured product formed by UV-curing the acrylic adhesive agent typically used may be impregnated with a solvent, and as a result, when parts formed of different materials are adhered to each other as described above, the repulsion resistance is so low that there occurs a problem in that under high temperature and high humidity conditions, lifting, bubbles, and the like occur, or the parts are even detached.

Therefore, in the present invention, a space capable of being impregnated with a solvent is sufficiently secured in a cured product (adhesive layer) formed by UV-curing an adhesive agent composition, and accordingly, a UV curing condition for implementing an excellent repulsion resistance and reliability under high temperature/high humidity is derived by improving flexibility of the adhesive layer.

The cured product includes a resin which is cross-linked by UV curing, and the like, and micro-pores or micro-spaces, and the like may be present between the cross-linkages, and when the cured product is immersed in a solvent, the solvent permeates the micro-pores, and as a result, the cured product may be impregnated with the solvent, and the higher the degree to which the cured product is impregnated with the solvent, the higher flexibility of the cured product may become.

That is, even though adhesive agent compositions have the same composition, the adhesive agent compositions may have definitely different physical properties according to the UV curing conditions, and it is essential to allow the adhesive sheet to have physical properties suitable for the use in order to prevent bubbles of the adhesive sheet from being generated and the detachment phenomenon of the adhesive sheet.

In consideration of these circumstances, an aspect of the present invention may provide an optical adhesive sheet, including: a substrate; and an adhesive agent layer formed on at least one surface of the substrate, in which the adhesive agent layer is formed by curing an adhesive agent composition including an acrylic copolymer formed by polymerizing a monomer mixture including ethylhexyl acrylate and isobornyl acrylate.

Here, the adhesive agent composition is cured by UV light having a UV intensity of 6 to 8 mW/cm$^2$ at an ambient temperature of 20 to 30° C.

In this case, a swelling rate of the adhesive agent layer, which is calculated by the following Equation 1, is an index indicating the cross-linking density of the adhesive agent composition after curing, and the adhesive agent layer may be formed so as to have a swelling rate of 60% or more, more preferably 60 to 90%.

$$\text{Swelling rate (\%)} = (W_2/W_1) \times 100 \quad \text{[Equation 1]}$$

Here, $W_1$=an initial weight which is a weight of a sample before immersing the sample, which is obtained by cutting a cured adhesive agent layer into a predetermined size, into a solvent, and $W_2$=a post weight which is a weight of a sample obtained by immersing the sample into a solvent, leaving the sample to stand for a predetermined time, filtering the sample using a filtration device, and then drying the sample.

As the solvent, it is possible to use, for example, chloroform, ethyl acetate, acetone, methanol, ethanol, isopropanol, butanol, dimethylformamide, and the like, and as the filtration device, it is possible to use, for example, a 300 mesh steel screen, but the examples are not limited thereto.

The time for which the sample is immersed and left to stand in a solvent may be, for example, 24 hours to 48 hours, but the time is sufficient as long as the other components except for the gel may be dissolved in a solvent and separated for the time, and is not particularly limited.

In addition, the conditions of temperature and time for drying a sample obtained by being filtered by means of the filtration device, may be 1 hour to 2 hours at 100° C. to 150° C., but the drying may be appropriately carried out under conditions of temperature and time sufficient for drying the sample, and the conditions of temperature and time are not particularly limited.

The adhesive agent layer formed by curing the adhesive agent composition has a swelling rate of 60 to 90%, thereby implementing a sufficient adhesive property and simultaneously implementing excellent durability. Furthermore, the adhesive agent layer has a swelling rate within the range, and thus may exhibit an excellent repulsion resistance.

If the adhesive agent layer has a swelling rate of less than 60%, the degree to which the adhesive agent composition is cured is so slight that the adhesive agent layer may flow down without implementing a predetermined shape, and if the adhesive agent layer has a swelling rate of more than 90%, the viscosity is so extremely high that the adhesive agent layer aggregates, and as a result, the adhesive performance may deteriorate.

Therefore, it is preferred that the adhesive agent layer included in the optical adhesive sheet according to the present invention is formed so as to have a swelling rate within the above-described range, and the formation of the adhesive agent layer having the swelling rate may be implemented by a total UV dose added to the adhesive agent composition by irradiating the adhesive agent composition with UV light having a UV intensity of 6 to 8 mW/cm$^2$ at an ambient temperature of 20 to 30° C.

Here, a total UV dose irradiated onto the adhesive agent composition at the ambient temperature may be 1,500 mJ/cm$^2$ or more, preferably 1,550 mJ/cm$^2$ or more. More preferably, the total UV dose is 1,575 mJ/cm$^2$ or more and 1,750 mJ/cm$^2$ or less.

When the total UV dose irradiated onto the adhesive agent composition at the ambient temperature is less than 1,500 mJ/cm$^2$, an effect of increasing the swelling rate and the repulsion resistance may be insufficient. In contrast, when the total UV dose irradiated onto the adhesive agent composition at the ambient temperature is more than 1,750 mJ/cm$^2$, the swelling rate and the repulsion resistance may be further increased, but the dynamic creep is rather decreased, and as a result, there is a concern in that durability of the adhesive sheet may be reduced.

Here, the acrylic copolymer may have a weight average molecular weight of 500,000 g/mol to 2,000,000 g/mol. When the molecular weight of the acrylic copolymer is more than 2,000,000 g/mol, there is a problem in that the specific weight of the adhesive agent composition is increased, and when the molecular weight thereof is less than 500,000 g/mol, there is a concern in that the durability may be weak, and bubbles may be generated when the sample is left to stand at high temperature and high humidity.

Further, the adhesive agent composition further includes 0.1 to 0.5 part by weight of a curing agent based on 100 parts by weight of the acrylic copolymer. As the curing agent, it is possible to use a (meth)acrylate-based curing agent typically used for a UV curing-type adhesive agent.

The adhesive agent composition further includes a photoinitiator selected from the group consisting of a benzoin-based initiator, a hydroxy ketone-based initiator, an amino ketone-based initiator, caprolactam, and a combination thereof.

The photoinitiator may be added in an amount of 0.3 to 0.5 part by weight based on 100 parts by weight of the acrylic copolymer.

More specifically, examples of the photoinitiator include: an a-hydroxy ketone-based compound (for example, IRGACURE 184, IRGACURE 500, IRGACURE 2959, and DAROCUR 1173 manufactured by Ciba Specialty Chemicals, Inc.); a phenylglyoxylate-based compound (for example, IRGACURE 754 and DAROCUR MBF manufactured by Ciba Specialty Chemicals, Inc.); a benzyl dimethyl ketal-based compound (for example, IRGACURE 651 manufactured by Ciba Specialty Chemicals, Inc.); an a-amino ketone-based compound (for example, IRGACURE 369, IRGACURE 907, and IRGACURE 1300 manufactured by Ciba Specialty Chemicals, Inc.); a monoacylphosphine-based compound (MAPO) (for example, DAROCUR TPO manufactured by Ciba Specialty Chemicals, Inc.); a bisacylphosphene-based compound (BAPO) (for example, IRGACURE 819 and IRGACURE 819DW manufactured by Ciba Specialty Chemicals, Inc.); a phosphine oxide-based compound (for example, IRGACURE 2100 manufactured by Ciba Specialty Chemicals, Inc.); a metallocene-based compound (for example, IRGACURE 784 manufactured by Ciba Specialty Chemicals, Inc.); iodonium salt (for example, IRGACURE 250 manufactured by Ciba Specialty Chemicals, Inc.); and the like.

In addition, the adhesive agent composition further includes 0.5 to 2 parts by weight of an additive based on 100 parts by weight of the acrylic copolymer.

Examples of the additive include an adhesive enhancer, an antioxidant, a light stabilizer, a UV absorber, a polymerization inhibitor, and the like.

The adhesive enhancer is a component which allows monomers included in an adhesive agent composition to be polymerized well with each other, and is added in order to improve the adhesive level of the adhesive agent layer after curing.

In the present invention, as a substrate, it is possible to use thermoplastic foam such as olefin-based foam, acrylic foam, or polyurethane-based foam, or thermosetting foam, particularly preferably polyethylene foam.

A polyethylene foam substrate has an excellent impact resistance such as repulsion resistance, but has a problem in that the durability thereof slightly deteriorates as compared to the durability of a thermoplastic plastic film such as a polyethylene terephthalate (PET) film.

Accordingly, it is possible to suppress bubbles, which may be generated when an adhesive agent layer is formed on a polyethylene foam, by using isobornyl acrylate as a (meth)acrylic acid ester-based monomer.

Furthermore, it is possible to make up for insufficient durability of the polyethylene foam by curing the adhesive agent layer under the above-described photo-curing conditions.

In contrast, when a thermoplastic plastic film such as a polyethylene terephthalate (PET) film is used instead of the polyethylene foam, it may be difficult to secure impact resistance such as repulsion resistance at a suitable level even though the adhesive agent layer is cured under the above-described photo-curing conditions.

The adhesive agent layer formed on at least one surface of the substrate may have a thickness of 10 μm to 50 μm.

Typically, the bonding property may be exhibited only when the thickness of the adhesive agent layer is about 25 μm or more, but the adhesive agent layer in the optical adhesive sheet according to the present invention is cured through the above-described UV curing conditions, and as a result, an excellent bonding property, an excellent repulsion resistance, and the like may be maintained even in a small thickness.

Hereinafter, specific examples of the present invention will be suggested. However, the Examples described below are only provided for specifically exemplifying or explaining the present invention, and the present invention is not limited thereby.

EXAMPLE 1

An adhesive agent composition was prepared by mixing and stirring 5 wt % of a copolymer formed by copolymerizing ethylhexyl acrylate (EHA), isobornyl acrylate (IBOA), and acrylic acid (AA), 75 wt % of a total sum of methyl methacrylate and acrylic acid, 0.1 wt % of a bifunctional curing agent 6-hexanediol diacrylate (HDDA), 0.1 wt % of a hexafunctional curing agent dipentaerythritol hexaacrylate (DPHA), a photoinitiator, and other additives.

Further, subsequently, the adhesive agent composition was cured by applying the adhesive agent composition onto one surface of a polyethylene (PE) foam, and irradiating the adhesive agent composition with UV light having a UV intensity of 7.38 mW/cm$^2$ at an ambient temperature of 20° C.

In this case, the total UV dose irradiated onto the adhesive agent composition was measured to be 1,578 mJ/cm$^2$.

EXAMPLE 2

In Example 2, an adhesive agent composition having the same composition as in Example 1 was cured by irradiation with UV light having a UV intensity of 7.38 mW/cm$^2$ at an ambient temperature of 25° C.

In this case, the total UV dose irradiated onto the adhesive agent composition was measured to be 1,635 mJ/cm$^2$.

COMPARATIVE EXAMPLE 1

In Comparative Example 1, an adhesive agent composition having the same composition as in Example 1 was cured by irradiation with UV light having a UV intensity of 7.38 mW/cm$^2$ at an ambient temperature of 5° C.

In this case, the total UV dose irradiated onto the adhesive agent composition was measured to be 1,282 mJ/cm$^2$.

COMPARATIVE EXAMPLE 2

In Comparative Example 2, an adhesive agent composition having the same composition as in Example 1 was cured by irradiation with UV light having a UV intensity of 7.38 mW/cm² at an ambient temperature of 10° C.

In this case, the total UV dose irradiated onto the adhesive agent composition was measured to be 1,319 mJ/cm².

COMPARATIVE EXAMPLE 3

In Comparative Example 3, an adhesive agent composition having the same composition as in Example 1 was cured by irradiation with UV light having a UV intensity of 7.38 mW/cm² at an ambient temperature of 15° C.

In this case, the total UV dose irradiated onto the adhesive agent composition was measured to be 1,436 mJ/cm².

COMPARATIVE EXAMPLE 4

In Comparative Example 4, an adhesive agent composition was cured in the same manner as in Example 1, except that methyl acrylate (MA) was used instead of isobornyl acrylate (IBOA) in the adhesive agent composition in Example 1.

COMPARATIVE EXAMPLE 5

In Comparative Example 5, an adhesive agent composition was cured in the same manner as in Example 1, except that a polyethylene terephthalate (PET) film was used instead of the polyethylene (PE) foam used in Example 1.

Evaluation Method

1) Measurement of Swelling Rate: The swelling rate was calculated according to the following Equation 1.

$$\text{Swelling rate (\%)} = (W_2/W_1) \times 100 \qquad [\text{Equation 1}]$$

Here, $W_1$=an initial weight which is a weight of a sample before immersing the sample, which is obtained by cutting a cured adhesive agent layer into a predetermined size, into a solvent, and $W_2$=a post weight which is a weight of a sample obtained by immersing the sample into a solvent, leaving the to stand for a predetermined time, filtering the sample using a filtration device, and then drying the sample.

Measurement Conditions: a solvent (ethyl acetate), a filtration device (a 300 mesh steel screen), time for dipping the sample in the solvent and leaving the sample to stand (24 hours), and temperature and time for drying a sample obtained by being filtered by the filtration device (110° C., 1 hour)

2) Measurement of Repulsion Resistance: For the adhesive sheets according to the Examples and the Comparative Examples, the time at which each adhesive layer was peeled off from plates formed of different materials was measured by the method described below, and the measured time was evaluated as repulsion resistance.

① A first plate with a size of 155×30×0.5 mm was prepared using an aluminum material, a second plate with a size of 170×35×2 mm was prepared using a polycarbonate material, and then these plates were washed once with isopropyl acetate (IPA) and three times with heptanes.

② Each sample was prepared by cutting each double-sided adhesive tape into a size of 150 mm×20 mm.

③ The sample was positioned by setting the edges in a longitudinal direction so as to coincide with each other on one surface of the first plate, and then the sample was pressed down by using two passes of a 7 kg roller, and subsequently, the second plate was positioned by setting the edges in a longitudinal direction so as to coincide with each other on one surface of the sample, and then the second plate was pressed down by using two passes of a 7 kg roller, thereby forming a laminate sample having a laminated structure of the second plate/the sample/the first plate.

④ The laminate sample was aged at 60° C. for 30 minutes, and then both ends thereof were fitted and inserted into a test jig formed of an aluminum material and with a dimension of 210×165×5 mm in a direction where a breath (170 mm) of the second plate and a length (165 mm) of the test jig were parallel with each other, and accordingly, the laminate sample was in a bent state.

Accordingly, one of the ends includes all of the layers (the second plate/the sample/the first plate) of the laminate sample, and the other includes only the second plate.

⑤ The laminate sample in a bent state was placed into a high temperature/high humidity chamber under a condition of 85° C./85% and left to stand for 2 hours, and the time required for the sample and at least one of the first plate and the second plate to be peeled off was measured by observing the sample laminated on the second plate at an interval of 10 minutes at the side of the end including only the second plate.

3) Measurement of Durability

An adhesive agent layer was formed on a substrate according to the Examples and the Comparative Examples, and the sample was stored under 85° C. and 85% relative humidity for 3 days, and then observed by the unaided eye to confirm whether bubbles were generated (no bubbles were generated=pass; bubbles were generated=fail).

TABLE 1

| Classification | Swelling rate (%) | Repulsion resistance (min) | Durability |
| --- | --- | --- | --- |
| Example 1 | 62.1 | 120 | pass |
| Example 2 | 63.8 | 122 | pass |
| Comparative Example 1 | 42.8 | 15 | fail |
| Comparative Example 2 | 50.6 | 26 | fail |
| Comparative Example 3 | 43.5 | 49 | pass |
| Comparative Example 4 | 58.6 | 115 | fail |
| Comparative Example 5 | 51.3 | 53 | pass |

According to the results in Table 1, even though adhesive agent compositions are composed of the same composition, a significant change in physical properties of an adhesive agent layer being a cured product occurred according to the UV curing conditions.

That is, in the case of Example 1 and Example 2 where the curing conditions were set so as for the total UV dose irradiated onto the adhesive agent composition at an ambient temperature of 20 to 30° C. to be 1,500 mJ/cm² or more, preferably 1,550 mJ/cm² or more, better swelling rates were exhibited than those of Comparative Examples 1 to 3, and accordingly, the repulsion resistance was also improved.

In contrast, in regard to the results of measuring the durability, in the case of Comparative Example 1, Comparative Example 2, and Comparative Example 4, it was observed that bubbles were generated, and as a result, it could be confirmed that the durabilities in Comparative Example 1, Comparative Example 2, and Comparative Example 4 were insufficient as compared to the Examples.

As described above, an exemplary embodiment of the present invention has been described, but it should be understood that a person with ordinary skill in the art may modify and change the present invention in various ways within the range not departing from the spirit of the present invention described in the claims by the addition, change, or deletion of constituent elements, and that the modifications and changes are included in the right scope of the present invention.

The invention claimed is:

1. An optical adhesive sheet, comprising:
a polyethylene foam substrate; and
an adhesive agent layer formed on at least one surface of the substrate, wherein the adhesive agent layer has micro pores capable of being impregnated with a solvent, wherein the adhesive agent layer is formed by curing an adhesive agent composition, which comprises an acrylic copolymer formed by polymerizing a monomer mixture consisting of ethylhexyl acrylate, isobornyl acrylate, and acrylic acid, and
a swelling rate of the adhesive agent layer, which is calculated by the following Equation 1, is from 60% to 90%:

$$\text{Swelling rate (\%)} = (W_2/W_1) \times 100 \quad \text{[Equation 1]}$$

where,
$W_1$=an initial weight which is a weight of a sample before immersing the sample, which is obtained by cutting a cured adhesive agent layer into a predetermined size, into a solvent, and
$W_2$=a post weight which is a weight of a sample obtained by immersing the sample into the solvent, wherein the solvent is chloroform, ethyl acetate, acetone, methanol, ethanol, isopropanol, butanol or dimethylformamide, leaving the sample to stand for a predetermined time, filtering the sample using a filtration device at a temperature from 100° C. to 150°, wherein the filtration device is a 300 mesh steel screen, and then drying the sample.

2. The adhesive sheet of claim 1, wherein the adhesive agent composition further comprises a photoinitiator selected from the group consisting of a benzoin-based initiator, a hydroxy ketone-based initiator, an amino ketone-based initiator, caprolactam, and a combination thereof.

3. The optical adhesive sheet of claim 1, wherein the acrylic copolymer is formed by polymerizing the monomer mixture at an ambient temperature of 20 to 30° C. by irradiation with UV light having a UV intensity of 6 to 8 mW/cm².

4. The optical adhesive sheet of claim 3, wherein a total UV dose irradiated onto the adhesive agent composition at an ambient temperature of 20 to 30° C. is 1,575 mJ/cm² to 1,750 mJ/cm².

5. A method for manufacturing an optical adhesive sheet of claim 1, the method comprising:
forming an adhesive agent composition comprising an acrylic copolymer formed by polymerizing a monomer mixture consisting of ethylhexyl acrylate, isobornyl acrylate and acrylic acid; and
forming an adhesive agent layer by applying the adhesive agent composition onto at least one surface of a polyethylene foam substrate and UV-curing the adhesive agent composition,
wherein the UV-curing is carried out by using UV light having a UV intensity of 6 to 8 mW/cm² at an ambient temperature of 20 to 30° C., and
a swelling rate of the adhesive agent layer, which is calculated by the following Equation 1, is from 60% to 90%:

$$\text{Swelling rate (\%)} = (W_2/W_1) \times 100 \quad \text{[Equation 1]}$$

where,
$W_1$=an initial weight which is a weight of a sample before immersing the sample, which is obtained by cutting a cured adhesive agent layer into a predetermined size, into a solvent, and
$W_2$=a post weight which is a weight of a sample obtained by immersing the sample into the solvent, leaving the sample to stand for a predetermined time, filtering the sample using a filtration device, and then drying the sample, and
wherein a total UV dose irradiated onto the adhesive agent composition at the ambient temperature is 1,575 mJ/cm² to 1,750 mJ/cm².

6. The method of claim 5, wherein the adhesive agent composition further comprises a photoinitiator selected from the group consisting of a benzoin-based initiator, a hydroxy ketone-based initiator, an amino ketone-based initiator, caprolactam, and a combination thereof.

* * * * *